US012363767B2

United States Patent
He et al.

(10) Patent No.: US 12,363,767 B2
(45) Date of Patent: Jul. 15, 2025

(54) METHOD, DEVICE, AND COMPUTER PROGRAM PRODUCT FOR COMMUNICATION OF INTERNET OF THINGS

(71) Applicant: Dell Products L.P., Round Rock, TX (US)

(72) Inventors: Bin He, Shanghai (CN); Jiacheng Ni, Shanghai (CN); Wenlei Wu, Shanghai (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 348 days.

(21) Appl. No.: 17/891,203

(22) Filed: Aug. 19, 2022

(65) Prior Publication Data

US 2024/0032117 A1  Jan. 25, 2024

(30) Foreign Application Priority Data

Jul. 21, 2022 (CN) .......................... 202210864099.4

(51) Int. Cl.
*H04W 76/10* (2018.01)
*H04W 84/04* (2009.01)
(Continued)

(52) U.S. Cl.
CPC .......... *H04W 76/10* (2018.02); *H04W 84/042* (2013.01); *H04W 88/16* (2013.01); *H04W 92/02* (2013.01)

(58) Field of Classification Search
CPC ... H04W 76/10; H04W 84/042; H04W 88/16; H04W 92/02; H04L 69/18; H04L 69/08; H04L 67/12
See application file for complete search history.

(56) References Cited

U.S. PATENT DOCUMENTS

2015/0288604 A1* 10/2015 Boudreaux ............ G08B 7/062
2017/0156165 A1*  6/2017 Krishnan ................ H04L 69/16
(Continued)

OTHER PUBLICATIONS

Wikipedia, "5G," https://en.wikipedia.org/wiki/5G, Aug. 14, 2022, 32 pages.
(Continued)

*Primary Examiner* — Rina C Pancholi
(74) *Attorney, Agent, or Firm* — Ryan, Mason & Lewis, LLP

(57) ABSTRACT

Embodiments of the present disclosure relate to a method, a device, and a computer program product for communication of the Internet of Things. The method includes receiving data of a first protocol from an access point of a first network, the data of the first protocol coming from an Internet of Things device wirelessly connected to the access point; converting the data of the first protocol into data of a second protocol through a gateway, the gateway having a first protocol stack corresponding to the first protocol and a second protocol stack corresponding to the second protocol; and sending the data of the second protocol to a core network node in a second network. According to the embodiments of the present disclosure, different types of networks can be converged with low cost and high efficiency through adaptation of protocol stacks between the different types of networks.

20 Claims, 5 Drawing Sheets

(51) Int. Cl.
  *H04W 88/16* (2009.01)
  *H04W 92/02* (2009.01)

(56) References Cited

U.S. PATENT DOCUMENTS

2018/0007557 A1* 1/2018 Lee .................. H04L 67/12
2018/0062847 A1* 3/2018 Mildh ................ H04W 12/033

OTHER PUBLICATIONS

Wikipedia, "Wi-Fi 6," https://en.wikipedia.org/wiki/Wi-Fi_6, Jul. 19, 2022, 6 pages.
ETSI, "Why Do We Need 5G?" https://www.etsi.org/technologies/5g?jjj=1604945362863, Accessed Nov. 9, 2020, 6pages.
3GPP "3rd Generation Partnership Project; Technical Specification Group Services and System Aspects; System architecture for the 5G System (5GS); Stage 2," Technical Specification 23.501 V16.3.0, Dec. 2019, 417 pages.
3GPP "3rd Generation Partnership Project; Technical Specification Group Services and System Aspects; Procedures for the 5G System (5GS); Stage 2," Technical Specification 23.502 V16.3.0, Dec. 2019, 558 pages.

* cited by examiner

METHOD, DEVICE, AND COMPUTER PROGRAM PRODUCT FOR COMMUNICATION OF INTERNET OF THINGS

RELATED APPLICATION(S)

The present application claims priority to Chinese Patent Application No. 202210864099.4, filed Jul. 21, 2022, and entitled "Method, Device, and Computer Program Product for Communication of Internet of Things," which is incorporated by reference herein in its entirety.

FIELD

Embodiments of the present disclosure generally relate to the technical field of communication, and particularly relate to a method, a device, and a computer program product for communication of the Internet of Things.

BACKGROUND

With the ongoing development of communication technologies, higher and higher data transmission capacities can be provided to users through various types of communication networks. These various types of communication networks each have unique advantages in terms of throughput, latency, density, coverage, availability, and reliability. The convergence of various different communication networks has become a new trend in the development of the communication industry.

In many industrial scenarios, there are devices of a variety of network types (such as LoRa, ZigBee, and Bluetooth), which need to be connected to a unified network (such as a 5G core network) for real-time monitoring, positioning, tracking, and management, so as to establish the Internet of Things between the devices. At this time, how to provide cost-effective, stable, and efficient network convergence has become an important area of research.

SUMMARY

In general, embodiments of the present disclosure provide a method, a device, and a computer program product for communication of the Internet of Things.

According to a first aspect of the present disclosure, a method for communication of the Internet of Things is provided. The method includes receiving data of a first protocol from an access point of a first network, the data of the first protocol coming from an Internet of Things device wirelessly connected to the access point; converting the data of the first protocol into data of a second protocol through a gateway, the gateway having a first protocol stack corresponding to the first protocol and a second protocol stack corresponding to the second protocol; and sending the data of the second protocol to a core network node in a second network. According to embodiments of the present disclosure, different types of networks can be converged with low cost and high efficiency through adaptation of protocol stacks between the different types of networks.

According to a second aspect of the present disclosure, a device for communication of the Internet of Things is provided, including: one or more processors; a memory coupled to at least one processor of the one or more processors; and computer program instructions stored in the memory, wherein the computer program instructions, when executed by the at least one processor, cause the device to perform actions including: receiving data of a first protocol from an access point of a first network, the data of the first protocol coming from an Internet of Things device wirelessly connected to the access point; converting the data of the first protocol into data of a second protocol through a gateway, the gateway having a first protocol stack corresponding to the first protocol and a second protocol stack corresponding to the second protocol; and sending the data of the second protocol to a core network node in a second network.

According to a third aspect of the present disclosure, a computer program product is provided. The computer program product is tangibly stored on a non-transitory computer-readable medium and includes machine-executable instructions. The machine-executable instructions, when executed by a machine, cause the machine to execute the method according to the first aspect of the present disclosure.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By the following Detailed Description of example implementations of the present disclosure, provided herein with reference to the accompanying drawings, the above and other objectives, features, and advantages of the present disclosure will become more apparent, where identical reference numerals generally represent identical components in the example implementations of the present disclosure.

DETAILED DESCRIPTION

Figure 1:
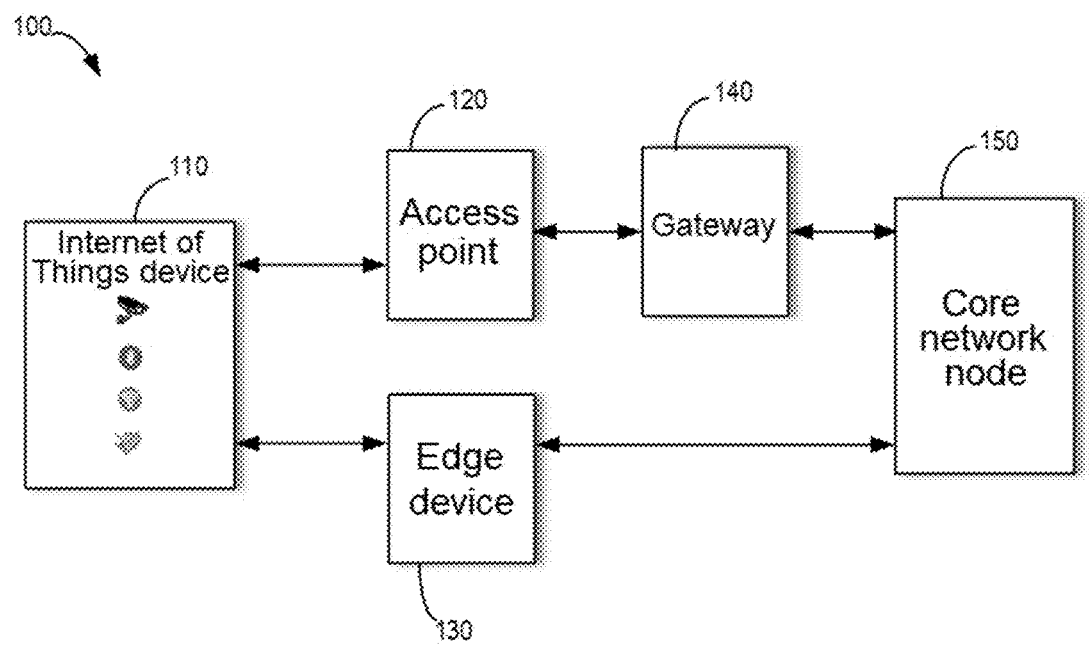
FIG. 1 shows a schematic diagram of an environment in which an embodiment of the present disclosure may be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

The term "second network" used herein can refer to a network that follows any appropriate communication standard, such as the fifth-generation (5G) system, long-term evolution (LTE), advanced LTE (LTE-A), wideband code division multiple access (WCDMA), high speed packet access (HSPA), narrowband Internet of things (NB-IoT), etc. In addition, the communication between a terminal device and a network device in a communication network can be performed according to any appropriate generation of communication protocol, including but not limited to the first-generation (1G), the second-generation (2G), 2.5G, 2.75G, the third-generation (3G), the fourth-generation (4G), 4.5G, the future fifth-generation (5G) new radio (NR) communication protocol, and/or any other protocol currently known or to be developed in the future. Embodiments of the present disclosure can be applied to various communication systems. Considering the rapid development of communication, of course, there will also be future types of communication technologies and systems that can reflect the present disclosure. The scope of the present disclosure should not be limited to the above systems only.

As mentioned above, it is expected to connect Internet of Things devices that communicate through multiple network types (such as LoRa, Zigbee, and Bluetooth) to a unified network for real-time monitoring, positioning, tracking, and management of the Internet of Things devices. Conventionally, integrated chips that integrate various communication technologies can be used to connect Internet of Things devices to a unified network. However, the integrated chips that integrate various communication technologies are high in cost and can only be used for specific scenarios. From a technical point of view, it is impossible to integrate all communication network functions in one chip. In addition, network communication technologies such as Wi-Fi6 and LoRa are widely used in industrial manufacturing, for example, the manufacturing industry, and it is difficult to uniformly replace the above-mentioned communication networks with a more advanced single network.

In order to at least partially solve the above problems and one or more of other potential problems, embodiments of the present disclosure provide a solution for communication of the Internet of Things. The solution includes receiving data of a first protocol from an access point of a first network first, the data of the first protocol coming from an Internet of Things device wirelessly connected to the access point. Then, the data of the first protocol are converted into data of a second protocol through a gateway, the gateway having a first protocol stack corresponding to the first protocol and a second protocol stack corresponding to the second protocol. Finally, the data of the second protocol are sent to a core network node in a second network. According to various embodiments of the present disclosure, different types of protocol stacks included in the gateway can be adapted between different types of networks, so that message exchange and data transmission between different networks can be performed. Since the protocol stacks can be implemented by software and are easy to modify according to different network configurations, different types of networks can be converged with low cost and high efficiency.

FIG. 1 shows a schematic diagram of environment 100 in which an embodiment of the present disclosure may be implemented. Environment 100 includes Internet of Things device 110, and Internet of Things device 110 can communicate through a first network in a wired or wireless mode. Although only one Internet of Things device 110 is shown in the figure, it is understood that there can be multiple Internet of Things devices 110, which can communicate through respective corresponding first networks. It is expected to connect Internet of Things device 110 to a unified second network (for example, core network node 150 in FIG. 1) for unified control. Core network node 150 may be a base station (BS), for example, a node B (NodeB or NB), an evolutionary node B (eNodeB or eNB), and a new radio next-generation node B (NR Next Generation NodeB or gNB).

The second network may be a network that is superior to the first network in terms of coverage and transmission speed. In some embodiments, the first network is a non-3rd generation partnership project (3GPP) cellular network, and the second network is a 3GPP cellular network. In some embodiments, the first network is at least one of: Wi-Fi, Bluetooth, LoRa, ZigBee, or a wired network (such as an HDMI serial port).

In order to connect Internet of Things device 110 of the first network to the second network, different methods may be used to achieve connection according to the characteristics of the first network and the Internet of Things device and different requirements of application scenarios. In some embodiments, Internet of Things device 110 of the first network may be connected to core network node 150 of the second network through gateway 140. For example, Internet of Things device 110 may be connected to its respective access point 120. Access point 120 may be a central transmitter and receiver for radio signals of the first network, which is used to connect Internet of Things device 110 to the first network. Then, the access point may be connected to gateway 140, and gateway 140 may be implemented by software. It can be understood that although gateway 140 is shown outside the access point, gateway 140 can also be implemented in the form of software within access point 120, which is not limited in the present disclosure.

Gateway 140 may be composed of the first protocol stack corresponding to the first network and the second protocol stack corresponding to the second network, and may be used for protocol conversion and adaptation to act as a "bridge" between the first network and the second network, so as to be used for communication between Internet of Things device 110 and core network node 150. It can be understood that unlike the integrated chip used for converged networks, the gateway can be implemented by software, which is easy to realize and low in cost. A specific protocol architecture of gateway 140 and a communication process of gateway 140 with other modules, units, and devices will be explained below.

In some other embodiments, Internet of Things device 110 may further be coupled to edge device 130, and edge device 130 is equipped with a communication module enabling communication between Internet of Things device 110 and core network node 150.

Figure 2:
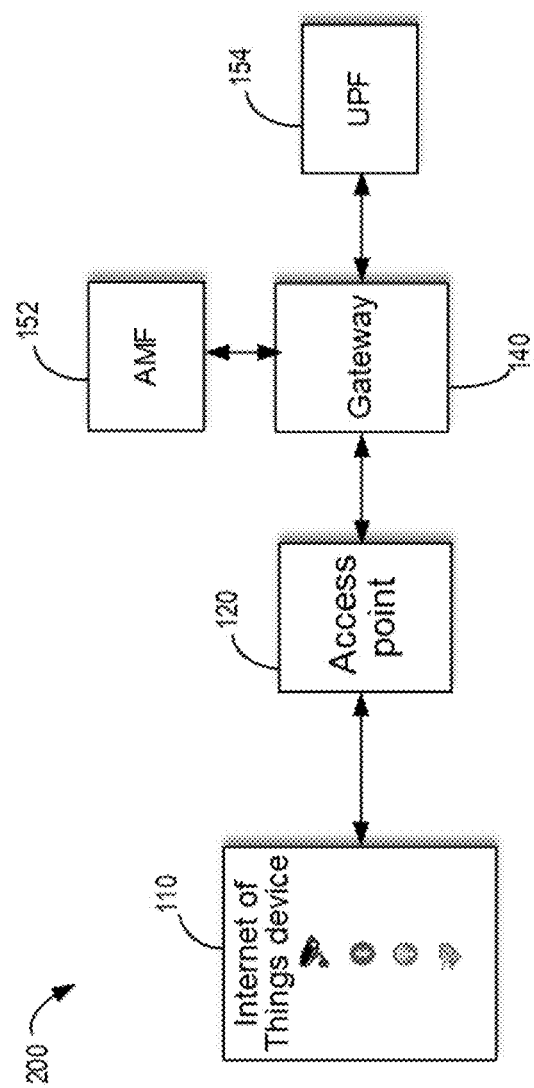
FIG. 2 shows a schematic diagram of an environment for communication through a gateway according to an embodiment of the present disclosure.

FIG. 2 shows a schematic diagram of environment 200 for communication through a gateway according to an embodiment of the present disclosure. Gateway 140 may convert a first protocol of a first network into a second protocol of a second network. In some embodiments, gateway 140 may "adapt" a protocol of a non-3GPP cellular network as a 3GPP cellular network protocol through the protocol stack in the gateway. For example, when the second network is a core network, in a control plane, gateway 140 may communicate with access and mobility management function (AMF) unit 152 of the core network node to perform certification. In a user plane, gateway 140 may communicate with user plane function (UPF) unit 154 of the core network node to transmit data, such as performing group routing forwarding, strategic implementation, traffic reports, etc. The above-mentioned certification and data transmission are achieved through the protocol stack of gateway 140, and a detailed protocol stack structure will be described below. It can be understood that the 5G core network, the AMF unit, and the UPF unit are only examples, and the second network may also be any other communication network.

Figure 3:
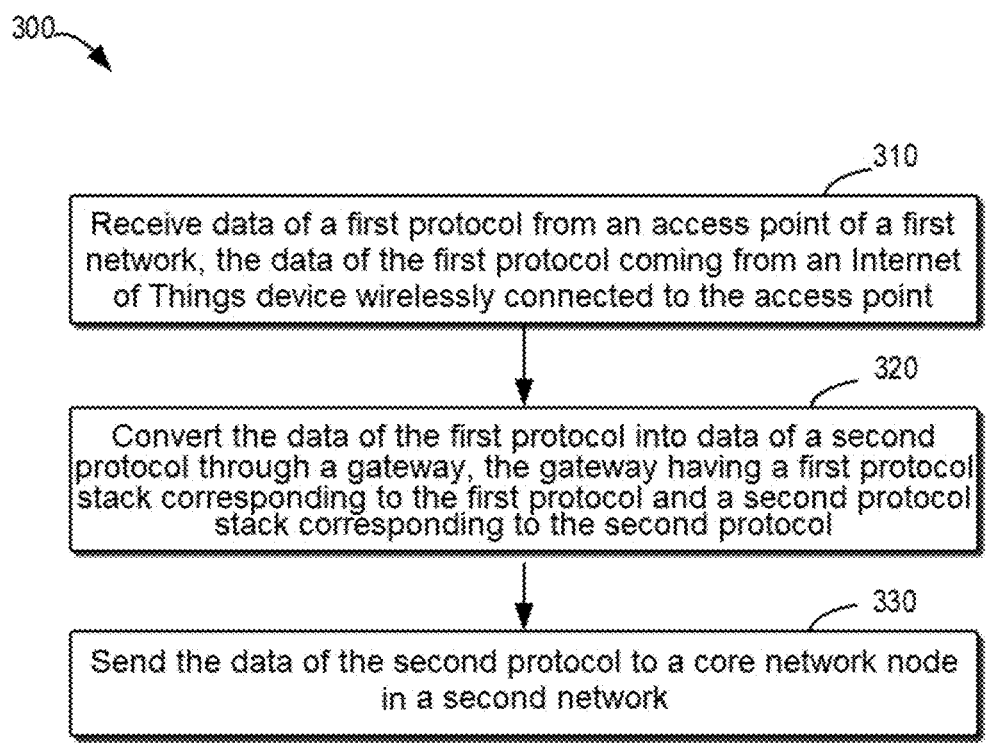
FIG. 3 shows a flow chart of a method for communication of the Internet of Things according to an embodiment of the present disclosure.

Principles and specific embodiments of the present disclosure will be described in detail below in combination with reference to FIG. 3 to FIG. 5. Referring first to FIG. 3, a flow chart of example communication method 300 is shown according to some embodiments of the present disclosure. It can be understood that method 300 can be implemented, for example, at gateway 140 shown in FIG. 1.

As shown in FIG. 3, at block 310, gateway 140 receives data of a first protocol from access point 120 of a first network, the data of the first protocol coming from Internet of Things device 110 wirelessly connected to access point 120. Access point 120 may receive data from Internet of Things device 110 through Wi-Fi, Bluetooth, LoRa, ZigBee, or a wired network, and then gateway 140 may receive the above data from access point 120. It can be understood that different first networks Wi-Fi, Bluetooth, LoRa, and ZigBee have different first protocols.

At block 320, the data of the first protocol are converted into data of a second protocol through gateway 140, gateway 140 having a first protocol stack corresponding to the first protocol and a second protocol stack corresponding to the second protocol. For example, gateway 140 may convert a first protocol of the first network into a second protocol of the second network through its own protocol stack architecture, so as to connect Internet of Things device 110 that originally does not have second network communication capability to core network node 150 of the second network.

In some embodiments, gateway 140 may establish communication between Internet of Things device 110 and core network node 150 in the control plane through its protocol stack architecture, and may realize data transmission between Internet of Things device 110 and core network node 150 in the user plane. The protocol conversion and communication in the control plane and the user plane will be described in conjunction with FIG. 4 and FIG. 5 respectively.

Figure 4:
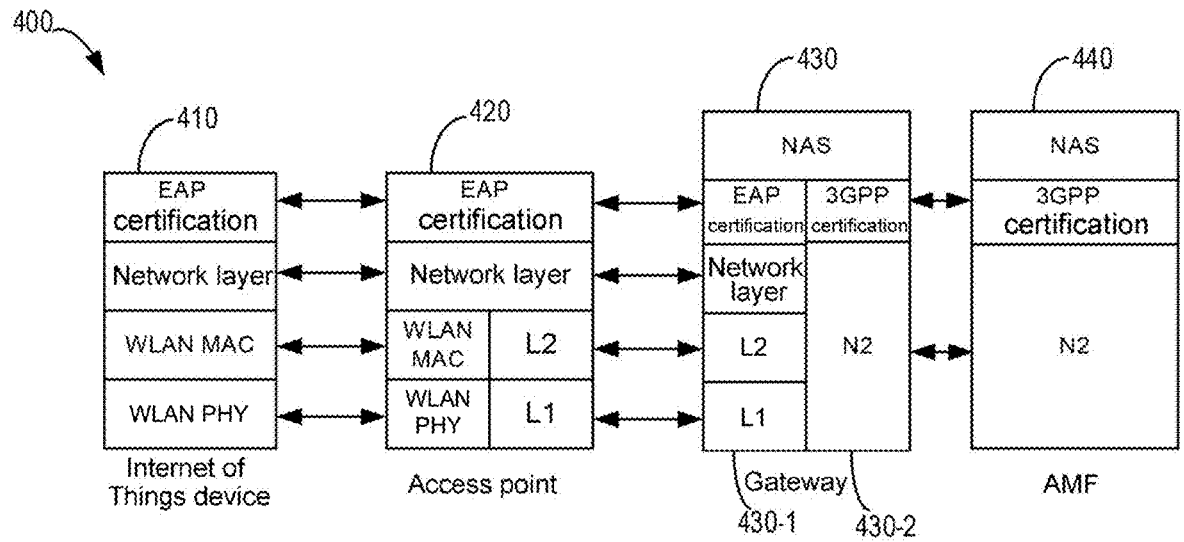
FIG. 4 shows a schematic diagram of a protocol stack in a control plane according to an embodiment of the present disclosure.

FIG. 4 shows schematic diagram 400 of a protocol stack in a control plane according to an embodiment of the present disclosure. For purposes of illustration, the following description takes the first network being a wireless local area network (WLAN) and the second network being a 5G core network as an example. As shown in FIG. 4, Internet of Things device 110, access point 120, gateway 140, and AMF unit 152 of core network node 150 have respective protocol stack architectures. Internet of Things device 110 has protocol stack 410, including an extensible authentication protocol (EAP) certification layer, a network layer, a medium access control layer WLAN MAC, and a physical layer WLAN PHY. Access point 120 has protocol stack 420, including an EAP certification layer, a network layer, a medium access control layer WLAN MAC, a physical layer WLAN PHY, an L2 layer, and an L1 layer. Gateway 140 has protocol stack 430, including a non-access stratum (NAS) layer, first protocol stack 430-1, and second protocol stack 430-2. First protocol stack 430-1 further includes an EAP certification layer, a network layer, an L2 layer, and an L1 layer. Second protocol stack 430-2 further includes a 3GPP certification layer and an N2 protocol stack. AMF unit 152 has protocol stack 440, including an NAS layer, a 3GPP certification layer, and an N2 protocol stack. Different modules, devices, and units can interact between the protocol stacks, which is shown by two-way arrows in the figures and is not repeated here.

It should be noted that the protocol stack structures of the above modules, devices, and units are only illustrative. According to different first networks and second networks, various presentation layers, application layers, certification layers, and the like may also be included, which is not limited in the present disclosure.

From the protocol stack architecture in FIG. 4, it can be seen that adjacent modules, units, and devices have corresponding protocol stacks for communication therebetween. For example, the EAP certification layer, the network layer, the medium access control layer WLAN MAC, and the physical layer WLAN PHY in protocol stack 410 respectively correspond to the EAP certification layer, the network layer, the medium access control layer WLAN MAC, and the physical layer WLAN PHY in protocol stack 420.

For communication between the two different networks, i.e., first network and second network, as shown in FIG. 4, gateway 140 includes first protocol stack 430-1 corresponding to the first protocol and second protocol stack 430-2 corresponding to the second protocol. In some embodiments, first protocol stack 430-1 includes protocol layers (such as EAP certification layer, network layer, L2 layer, and L1 layer) corresponding to the protocol layers in protocol stack 410 of Internet of Things device 110 and in protocol stack 420 of access point 120. Second protocol stack 430-2 includes protocol layers (such as 3GPP certification layer and N2 protocol stack) corresponding to the protocol layers in protocol stack 440 of AMF unit 152. The protocol layers included in first protocol stack 430-1 and second protocol stack 430-2 in FIG. 4 are only illustrative, and other types of protocol layers may also be included.

In some embodiments, in the control plane, gateway 140 may receive first certification information of the first protocol from Internet of Things device 110 through first protocol stack 430-1 (such as the EAP certification layer in the first protocol stack). Since gateway 140 includes first protocol stack 430-1 and second protocol stack 430-2 at the same time, gateway 140 may adapt the first certification information as second certification information of the second protocol. After that, gateway 140 may send the second certification information to AMF unit 152 of the core network node 150 through second protocol stack 430-2 (such as the 3GPP certification layer in the second protocol stack) to establish communication between Internet of Things device 110 and core network node 150. It can be understood that the first protocol stack and the second protocol stack of gateway 140 may be implemented by software, and may be constructed according to different types of first networks and second networks. Therefore, compared with implementation by hardware, it has the advantages of high adaptability and low cost. Through the above-mentioned structure of gateway 140, fast and efficient certification can be performed between different networks.

After performing the certification between Internet of Things device 110 and core network node 150 through gateway 140, data conversion and transmission can be implemented in the user plane through gateway 140.

Figure 5:
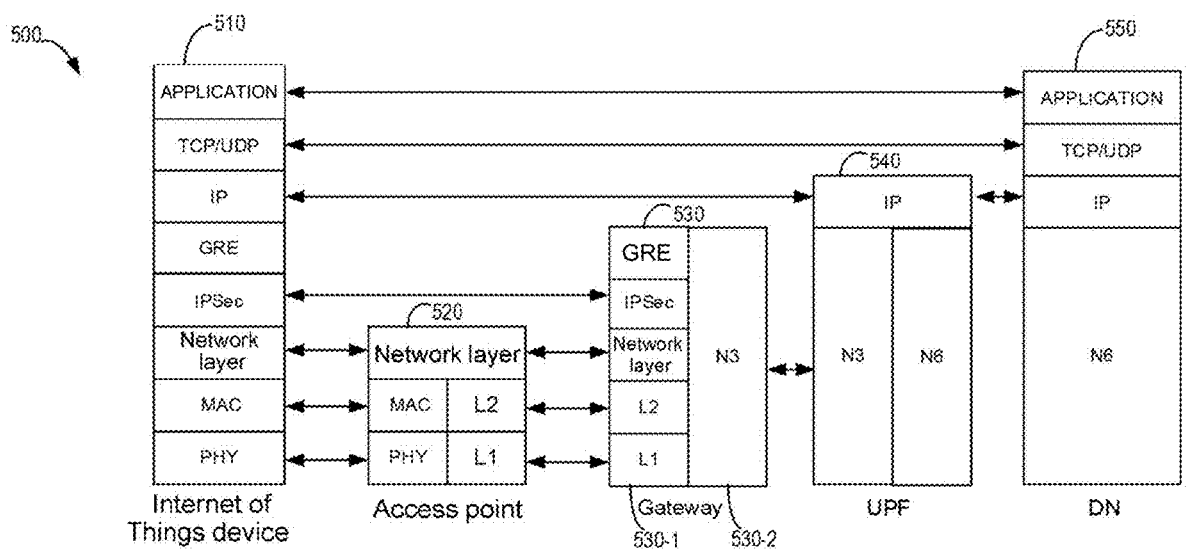
FIG. 5 shows a schematic diagram of a protocol stack in a user plane according to an embodiment of the present disclosure.

FIG. 5 shows schematic diagram 500 of a protocol stack in a user plane according to an embodiment of the present disclosure. For purposes of illustration, the following description continues to take the first network being a WLAN and the second network being a 5G core network as an example. As shown in FIG. 5, Internet of Things device 110, access point 120, gateway 140, UPF unit 154 of core network node 150, and a data network (DN) unit of core network node 150 have respective protocol stack architectures. Internet of Things device 110 has protocol stack 510, including an APPLICATION layer, a TCP/UDP transmission layer, an IP layer, a GRE layer, an IPsec layer, a network layer, a medium access control layer MAC, and a physical layer PHY. Access point 120 has protocol stack 520, including a network layer, a medium access control layer MAC, a physical layer PHY, an L2 layer, and an L1 layer. Gateway 140 has protocol stack 530, including first protocol stack 530-1 and second protocol stack 530-2. First protocol stack 530-1 further includes a GRE layer, an IPsec layer, a network layer, an L2 layer, and an L1 layer. Second protocol stack 530-2 further includes an N3 protocol stack, and the N3 protocol stack further includes a GTP-U layer, a UDP layer, an IP layer, an L2 layer, and an L1 layer. UPF unit 154 has protocol stack 540, including an IP layer, an N3 protocol stack, and an N6 protocol stack. The DN unit has protocol stack 550, including an application layer, a TCP/UDP transmission layer, an IP layer, and an N6 protocol stack. Different modules, devices, and units can interact between the protocol stacks, which is shown by two-way arrows in the figures and is not repeated here.

It should be noted that the protocol stack structures of the above modules, devices, and units are only illustrative. According to different first networks and second networks, various presentation layers, application layers, certification layers, and the like may also be included, which is not limited in the present disclosure.

From the protocol stack architecture in FIG. 5, it can be seen that adjacent modules, units, and devices have corresponding protocol stacks for communication therebetween. For example, the application layer and the TCP/UDP transmission layer in protocol stack 510 may correspond to the application layer and the TCP/UDP transmission layer in the DN unit. The IP layer in protocol stack 510 may correspond to the IP layer in the UPF unit 154. The IPsec layer in protocol stack 510 may correspond to the IPsec layer in gateway 140.

For communication between the two different networks, i.e., first network and second network, as shown in FIG. 5, gateway 140 may include first protocol stack 530-1 corresponding to the first protocol and second protocol stack 530-2 corresponding to the second protocol. In some embodiments, first protocol stack 530-1 may include protocol layers (such as a GRE layer, an IPsec layer, a network layer, an L2 layer, and an L1 layer) corresponding to protocol stack 510 of Internet of Things device 110 and protocol stack 520 of access point 120. Second protocol stack 530-2 includes protocol layers (such as N3 protocol stack) corresponding to the protocol layers in protocol stack 540 of UPF unit 154 of core network node 150.

In some embodiments, in the user plane, gateway 140 may receive the data of the first protocol from Internet of Things device 110 through first protocol stack 530-1. Since gateway 140 includes first protocol stack 530-1 and second protocol stack 530-2 at the same time, gateway 140 may adapt the data of the first protocol as data of the second protocol. After that, gateway 140 may send the data of the second protocol to UPF unit 154 of core network node 150 through second protocol stack 530-2 (such as the N3 protocol stack in the second protocol stack). It can be understood that the first protocol stack and the second protocol stack of gateway 140 may be implemented by software, and may be constructed according to different types of first networks and second networks. Therefore, compared with implementation by hardware, it has the advantages of high adaptability and low cost. Through the above-mentioned structure of gateway 140, fast and efficient data transmission can be performed between different networks.

Through the protocol stack architecture of gateway 140, Internet of Things device 110 may be connected to the second network. Referring back to FIG. 3, at block 330, gateway 140 sends the data of the second protocol to core network node 150 in the second network. For the specific transmission process, see the descriptions of FIG. 4 and FIG. 5 above, which will not be repeated here.

The above describes the process of transmitting data from Internet of Things device 110 to core network node 150 via gateway 140. It can be understood that core network node 150 may also transmit data to Internet of Things device 110 via gateway 140. In some embodiments, gateway 140 may receive the data of the second protocol from core network node 150. Then, the data of the second protocol are converted into the data of the first protocol through gateway 140. Finally, the data of the first protocol are sent to Internet of Things device 110 through access point 120.

Software "aggregation" on a network side is described above, that is, gateway 140 is used to connect Internet of Things device 110 to core network node 150. "Aggregation" may also be performed on a terminal side by utilizing a hardware device. Alternatively, in some embodiments, in a case where Internet of Things device 110 requires low-latency transmission, a user device may be coupled to an edge device through wired connection, and the edge device is equipped with a communication module enabling communication between Internet of Things device 110 and core network node 150 of the second network. For example, an edge device such as a PC or an ARM board may be equipped with a 5G module, the 5G module is connected to the edge device through a USB interface, and the 5G module is also connected to an external antenna for radio connection. Internet of Things device 110 is connected, for example, by an HDMI serial port edge device, which may implement communication between Internet of Things device 110 and a 5G core network. The above hardware implementation solution can be adapted to various Internet of Things scenarios and has high flexibility. In addition, the use of hardware aggregation and wired connection can minimize data transmission latency to ensure real-time monitoring and management of some important devices.

Through the solution of the present disclosure, multiple types of aggregation can be achieved on different networks, for example, the gateway of the software type implemented on the network side and the edge device of the hardware type implemented on the terminal side. The gateway has two protocol stacks corresponding to different network protocols, and has the advantages of high adaptability and low cost. The edge device has the advantages of high flexibility and high transmission speed. It can be understood that different "aggregation" methods can be used for different Internet of Things devices to achieve convergence between different networks.

Figure 6:
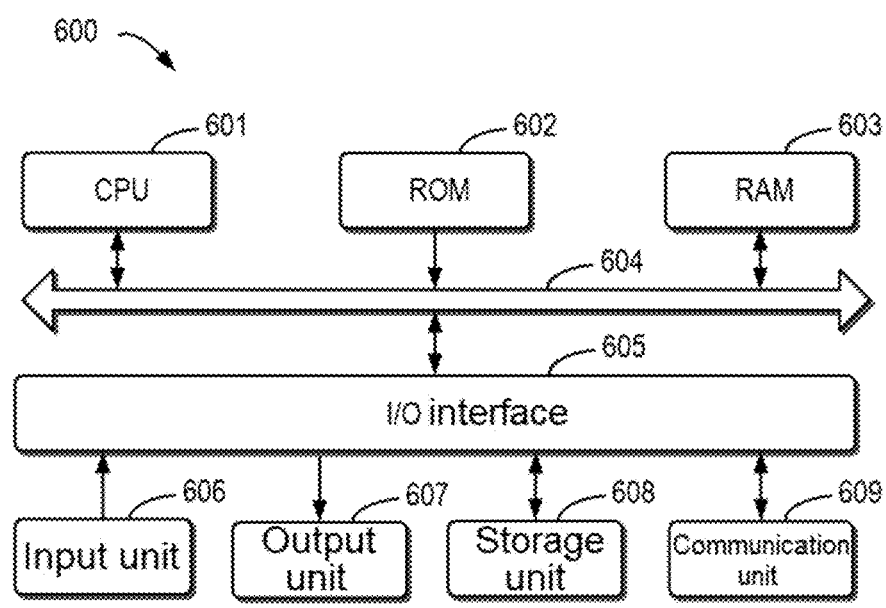
FIG. 6 shows a schematic block diagram of a device that may be configured to implement an embodiment of the present disclosure.

FIG. 6 illustrates a schematic block diagram of device 600 that can be used to implement embodiments of the present disclosure. As shown in the figure, device 600 includes central processing unit (CPU) 601 that may execute various appropriate actions and processing according to computer program instructions stored in read-only memory (ROM)

602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

In some embodiments, CPU 601 can be configured to perform the various processes and processing described above, such as method 300. For example, in some embodiments, method 300 may be implemented as a computer software program that is tangibly included in a machine-readable medium such as storage unit 608. In some embodiments, part of or all the computer program may be loaded and/or installed onto device 600 via ROM 602 and/or communication unit 609. One or more steps of method 300 described above may be performed when the computer program is loaded into RAM 603 and executed by CPU 601.

In particular, according to embodiments of the present disclosure, the processes described above with reference to FIG. 6 may be implemented as a computer program product that may be tangibly stored on a non-transitory computer-readable storage medium and includes computer-executable instructions that, when executed, cause a machine to implement various aspects in accordance with the present disclosure.

The computer-readable storage medium may be a tangible device that can store instructions used by an instruction execution device. For example, the computer-readable storage medium may include, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Java, Smalltalk, and C++, and conventional procedural programming languages, such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to block diagrams and/or flowcharts of the device, the method, and the computer program product according to embodiments of the present disclosure. It should be understood that each block in the block diagrams and/or flowcharts as well as a combination of blocks in the block diagrams and/or flowcharts may be implemented by using the computer-readable program instructions.

Through the teachings presented in the foregoing descriptions and the associated drawings, many modifications and other embodiments of the present disclosure set forth herein will be apparent to those skilled in the art. Therefore, it is to be understood that embodiments of the present disclosure are not to be limited to the specific embodiments disclosed and that modifications and other embodiments are intended to be included within the scope of the present disclosure. Additionally, while the foregoing description and associated drawings describe example embodiments in the context of certain example combinations of components and/or functions, it should be appreciated that various combinations of components and/or functions may be provided by alternative embodiments without departing from the scope of the present disclosure. In this regard, for example, other combinations of components and/or functions different from those expressly described above are also contemplated to be within the scope of the present disclosure. Although specific terms are employed herein, they are used in a generic and descriptive sense only and are not intended to be limiting.

What is claimed is:

1. A method comprising:
receiving data of a first protocol from an access point of a first network, the data of the first protocol coming from an Internet of Things device wirelessly connected to the access point;
converting the data of the first protocol into data of a second protocol through a gateway, the gateway being arranged between the access point of the first network and a core network node in a second network, the gateway having a first protocol stack corresponding to the first protocol and a second protocol stack corresponding to the second protocol, the first and second protocol stacks being arranged in parallel with one another within the gateway, the first protocol stack supporting communication between the gateway and the access point of the first network, the second protocol stack supporting communication between the gateway and the second network, wherein the core network node in the second network implements a mobility management function of the second network, and wherein the gateway further comprises an additional protocol stack supporting communication between the gateway and an additional network node of the second network, separate from the core network node, the additional network node implementing a user plane function of the second network; and sending the data of the second protocol from the gateway to the core network node in the second network;

wherein the first protocol stack of the gateway comprises a first certification layer of a first type configured for communication with a corresponding certification layer of the first type in a protocol stack of the access point of the first network in accordance with the first protocol; and wherein the second protocol stack of the gateway comprises a second certification layer of a second type different than the first type, the second certification layer being configured for communication with a corresponding certification layer of the second type in a control plane protocol stack of a management function entity of the second network.

2. The method according to claim 1, further comprising:
receiving the data of the second protocol from the core network node;
converting the data of the second protocol into the data of the first protocol through the gateway; and
sending the data of the first protocol to the Internet of Things device through the access point.

3. The method according to claim 1, wherein converting the data of the first protocol into the data of the second protocol through the gateway comprises:
establishing communication between the Internet of Things device and the core network node in a control plane; and
realizing data transmission between the Internet of Things device and the core network node in a user plane.

4. The method according to claim 3, wherein establishing communication between the Internet of Things device and the core network node in the control plane comprises:
receiving first certification information of the first protocol from the Internet of Things device through the first protocol stack;
adapting the first certification information as second certification information of the second protocol; and
sending the second certification information to the core network node through the second protocol stack to establish communication between the Internet of Things device and the core network node.

5. The method according to claim 3, wherein realizing data transmission between the Internet of Things device and the core network node in the user plane comprises:
receiving the data of the first protocol from the Internet of Things device through the first protocol stack, the first protocol stack having protocol layers corresponding to a protocol layer in a protocol stack of the Internet of Things device and a protocol layer in a protocol stack of the access point respectively;
adapting the data of the first protocol as the data of the second protocol; and
sending the data of the second protocol to the core network node through the second protocol stack, the second protocol stack having protocol layers corresponding to protocol layers in a protocol stack of the core network node respectively.

6. The method according to claim 1, further comprising:
coupling the Internet of Things device to an edge device, the edge device being equipped with a communication module enabling communication between the Internet of Things device and the core network node.

7. The method according to claim 1, wherein the first network is a non-3rd generation partnership project (3GPP) cellular network, and the second network is a 3GPP cellular network.

8. The method according to claim 1, wherein the first network is at least one of: Wi-Fi, Bluetooth, LoRa, ZigBee, or a wired network.

9. A device comprising:
one or more processors;
a memory coupled to at least one processor of the one or more processors; and
computer program instructions stored in the memory, wherein the computer program instructions, when executed by the at least one processor, cause the device to perform actions comprising:
receiving data of a first protocol from an access point of a first network, the data of the first protocol coming from an Internet of Things device wirelessly connected to the access point;
converting the data of the first protocol into data of a second protocol through a gateway, the gateway being arranged between the access point of the first network and a core network node in a second network, the gateway having a first protocol stack corresponding to the first protocol and a second protocol stack corresponding to the second protocol, the first and second protocol stacks being arranged in parallel with one another within the gateway, the first protocol stack supporting communication between the gateway and the access point of the first network, the second protocol stack supporting communication between the gateway and the second network, wherein the core network node in the second network implements a mobility management function of the second network, and wherein the gateway further comprises an additional protocol stack supporting communication between the gateway and an additional network node of the second network, separate from the core network node, the additional network node implementing a user plane function of the second network; and
sending the data of the second protocol from the gateway to the core network node in the second network;
wherein the first protocol stack of the gateway comprises a first certification layer of a first type configured for communication with a corresponding certification layer of the first type in a protocol stack of the access point of the first network in accordance with the first protocol; and
wherein the second protocol stack of the gateway comprises a second certification layer of a second type different than the first type, the second certification layer being configured for communication with a corresponding certification layer of the second type in a control plane protocol stack of a management function entity of the second network.

10. The device according to claim 9, wherein the actions further comprise:
receiving the data of the second protocol from the core network node;
converting the data of the second protocol into the data of the first protocol through the gateway; and sending the data of the first protocol to the Internet of Things device through the access point.

11. The device according to claim 9, wherein converting the data of the first protocol into the data of the second protocol through the gateway comprises:
    establishing communication between the Internet of Things device and the core network node in a control plane; and
    realizing data transmission between the Internet of Things device and the core network node in a user plane.

12. The device according to claim 11, wherein establishing communication between the Internet of Things device and the core network node in the control plane comprises:
    receiving first certification information of the first protocol from the Internet of Things device through the first protocol stack;
    adapting the first certification information as second certification information of the second protocol; and
    sending the second certification information to the core network node through the second protocol stack to establish communication between the Internet of Things device and the core network node.

13. The device according to claim 11, wherein realizing data transmission between the Internet of Things device and the core network node in the user plane comprises:
    receiving the data of the first protocol from the Internet of Things device through the first protocol stack, the first protocol stack having protocol layers corresponding to a protocol layer in a protocol stack of the Internet of Things device and a protocol layer in a protocol stack of the access point respectively;
    adapting the data of the first protocol as the data of the second protocol; and
    sending the data of the second protocol to the core network node through the second protocol stack, the second protocol stack having protocol layers corresponding to protocol layers in a protocol stack of the core network node respectively.

14. The device according to claim 9, wherein the actions further comprise:
    coupling the Internet of Things device to an edge device, the edge device being equipped with a communication module enabling communication between the Internet of Things device and the core network node.

15. The device according to claim 9, wherein the first network is a non-3rd generation partnership project (3GPP) cellular network, and the second network is a 3GPP cellular network.

16. The device according to claim 9, wherein the first network is at least one of: Wi-Fi, Bluetooth, LoRa, ZigBee, or a wired network.

17. A computer program product tangibly stored on a non-transitory computer-readable medium and comprising machine-executable instructions, wherein the machine-executable instructions, when executed by a machine, cause the machine to perform actions comprising:
    receiving data of a first protocol from an access point of a first network, the data of the first protocol coming from an Internet of Things device wirelessly connected to the access point;
    converting the data of the first protocol into data of a second protocol through a gateway, the gateway being arranged between the access point of the first network and a core network node in a second network, the gateway having a first protocol stack corresponding to the first protocol and a second protocol stack corresponding to the second protocol, the first and second protocol stacks being arranged in parallel with one another within the gateway, the first protocol stack supporting communication between the gateway and the access point of the first network, the second protocol stack supporting communication between the gateway and the second network, wherein the core network node in the second network implements a mobility management function of the second network, and wherein the gateway further comprises an additional protocol stack supporting communication between the gateway and an additional network node of the second network, separate from the core network node, the additional network node implementing a user plane function of the second network; and
    sending the data of the second protocol from the gateway to the core network node in the second network;
    wherein the first protocol stack of the gateway comprises a first certification layer of a first type configured for communication with a corresponding certification layer of the first type in a protocol stack of the access point of the first network in accordance with the first protocol; and
    wherein the second protocol stack of the gateway comprises a second certification layer of a second type different than the first type, the second certification layer being configured for communication with a corresponding certification layer of the second type in a control plane protocol stack of a management function entity of the second network.

18. The computer program product according to claim 17, wherein the actions further comprise:
    receiving the data of the second protocol from the core network node;
    converting the data of the second protocol into the data of the first protocol through the gateway; and
    sending the data of the first protocol to the Internet of Things device through the access point.

19. The computer program product according to claim 17, wherein converting the data of the first protocol into the data of the second protocol through the gateway comprises:
    establishing communication between the Internet of Things device and the core network node in a control plane; and
    realizing data transmission between the Internet of Things device and the core network node in a user plane.

20. The computer program product according to claim 19, wherein establishing communication between the Internet of Things device and the core network node in the control plane comprises:
    receiving first certification information of the first protocol from the Internet of Things device through the first protocol stack;
    adapting the first certification information as second certification information of the second protocol; and
    sending the second certification information to the core network node through the second protocol stack to establish communication between the Internet of Things device and the core network node.

* * * * *